United States Patent [19]
Copenhafer et al.

[11] 4,288,419
[45] Sep. 8, 1981

[54] ENHANCED RECOVERY OF SODIUM CARBONATE FROM NaCL-CONTAINING SODIUM CARBONATE SOLUTIONS

[75] Inventors: William C. Copenhafer, Yardley, Pa.; Francis Rauh, Plainsboro, N.J.

[73] Assignee: Intermountain Research & Develop. Corp., Green River, Wyo.

[21] Appl. No.: 137,209

[22] Filed: Apr. 4, 1980

[51] Int. Cl.$^3$ .................. C01D 7/07; C01D 7/26; E21B 43/28

[52] U.S. Cl. .................. 423/190; 23/302 T; 299/5; 423/195; 423/206 T; 423/421

[58] Field of Search .............. 23/302 T; 423/206 T, 423/188, 189, 190, 195, 203, 205, 421, 424, 426; 299/5

[56] References Cited

U.S. PATENT DOCUMENTS

| | | | |
|---|---|---|---|
| 1,907,987 | 5/1933 | Lynn | 423/424 |
| 2024187 | 1/1980 | GBX. | |
| 2,133,455 | 10/1938 | Keene et al. | 423/421 |
| 3,184,287 | 5/1965 | Gancy | 423/206 T |
| 3,264,057 | 8/1966 | Miller | 423/206 T |
| 3,273,959 | 9/1966 | Miller | 423/206 T |
| 3,425,795 | 2/1969 | Howard et al. | 423/206 T |
| 3,451,767 | 6/1969 | Saeman | 423/190 |
| 3,656,892 | 4/1972 | Bourne et al. | 423/206 T |

FOREIGN PATENT DOCUMENTS 46-16664  5/1971 Japan .................. 423/421

*Primary Examiner*—Gary P. Straub
*Attorney, Agent, or Firm*—Christopher Egolf

[57] ABSTRACT

A method for enhancing recovery of sodium carbonate from sodium carbonate solutions which contain sodium chloride. Anhydrous sodium carbonate is recovered in good yields from aqueous sodium carbonate solutions containing sodium chloride by evaporative crystallization at superatmospheric pressure and at a temperature of at least about 120° C.

9 Claims, 2 Drawing Figures

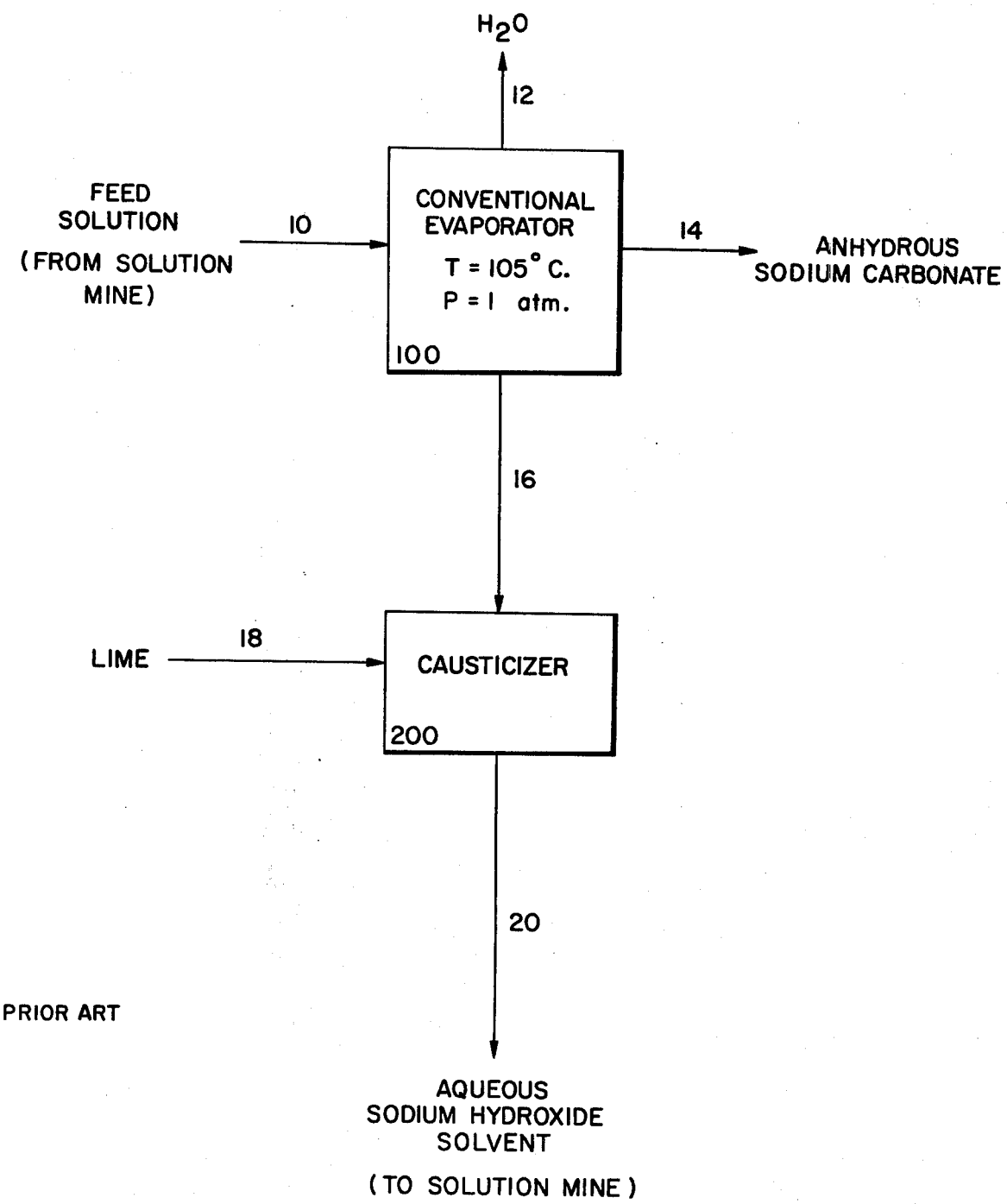

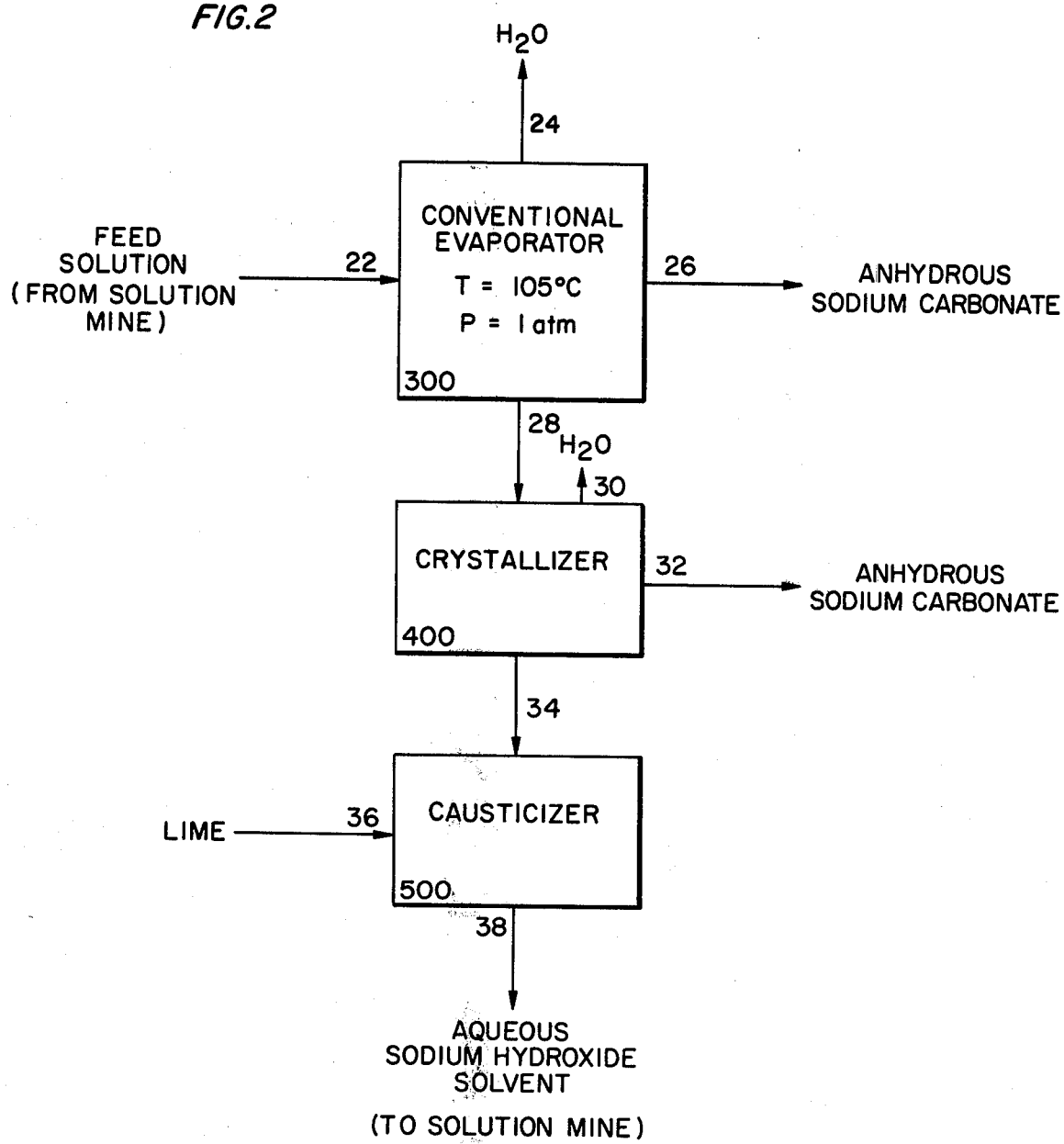

ENHANCED RECOVERY OF SODIUM CARBONATE FROM NACL-CONTAINING SODIUM CARBONATE SOLUTIONS

FIELD OF THE INVENTION

This invention relates to a method for recovering anhydrous sodium carbonate from NaCl-containing aqueous sodium carbonate solutions.

BACKGROUND OF THE PRIOR ART

Solution mining techniques for recovering soda ash (sodium carbonate) from subterranean trona ore deposits, such as described in U.S. Pat. No. 3,184,287 (issued to Gancy), are ordinarily operated in a cyclic manner. The mining solvent is typically regenerated from the mother liquor which remains after recovery of the solid sodium carbonate (monohydrate or anhydrous forms) from the withdrawn mining solution. High sodium carbonate recoveries are thus desirable so as to avoid carrying a large inventory of soluble sodium carbonate in the regenerated recycled mining solvent.

Solution mining of trona ore deposits which are contaminated with sodium chloride typically results in an appreciable concentration of sodium chloride in the withdrawn mining solution. This complicates the recovery of sodium carbonate in high yields because of the likelihood of co-precipitation of sodium chloride with the sodium carbonate product.

Prior art methods for crystallizing sodium carbonate from aqueous sodium carbonate solutions having an appreciable sodium chloride content do not teach means for recovering high yields of sodium carbonate, without co-precipitation of sodium chloride. U.S. Pat. Nos. 2,133,455 (issued to Keene et al) and 3,656,892 (issued to Bourne et al) disclose that anhydrous sodium carbonate may be crystallized from sodium carbonate solutions at temperatures around 105°–110° C. via the introduction of an additive like sodium chloride into the crystallizer. The introduction of sodium chloride into the crystallizer liquor lowers the monohydrate-anhydrous transition temperature and thereby yields anhydrous sodium carbonate, not the monohydrate, as the crystallized solid.

The method of the present invention provides for enhanced sodium carbonate recoveries from aqueous sodium carbonate solutions which also contain sodium chloride, without co-precipitation of salt which would contaminate the sodium carbonate product.

SUMMARY OF THE INVENTION

In accordance with the present invention, sodium carbonate values are recovered in enhanced yields from an NaCl-containing aqueous sodium carbonate solution by subjecting an aqueous sodium carbonate solution which also contains sodium chloride to evaporative crystallization at superatmospheric pressure and at a temperature sufficiently high to induce crystallization of anhydrous sodium carbonate crystals without co-crystallization of sodium chloride and yield a crystallizer mother liquor containing less than 10% by weight $Na_2CO_3$ and greater than 22% by weight NaCl, and separating the crystallized solids from the crystallizer mother liquor to recover the anhydrous sodium carbonate product.

The crystallization temperature desirably is sufficiently high to reduce the sodium carbonate concentration in the crystallizer mother liquor below 9% $Na_2CO_3$ and, most preferably, below 6% $Na_2CO_3$. The crystallization temperature is desirably at least about 120° C., and most preferably at least about 160° C.

Aqueous NaCl-containing sodium carbonate solutions treated by the method of this invention may possess fairly substantial amounts of sodium chloride relative to the sodium carbonate present. In order to preclude the possibility of co-crystallization of sodium chloride in the crystallizer, the $NaCl:Na_2CO_3$ weight ratio of the feed solution should be less than about 2.7:1 when the crystallization temperature is about 120° C. When the higher, preferred crystallization temperatures are employed, however, the NaCl-containing sodium carbonate feed solution may contain a substantially higher proportion of salt: at the preferred crystallization temperature of about 160° C., the $NaCl:Na_2CO_3$ weight ratio of the feed solution may be as high as 4.5:1.

BRIEF DESCRIPTION OF THE DRAWINGS

FIG. 1 is a schematic flow diagram that illustrates the prior art and is included for comparative purposes only, in which a cyclic solution mining process utilizes a conventional evaporator to recover anhydrous sodium carbonate from NaCl-contaminated subterranean trona ore deposits.

FIG. 2 is a schematic flow diagram that illustrates the method of the present invention, in which an anhydrous sodium carbonate crystallizer is operated at superatmospheric pressure and a temperature of 120° C. and is utilized in the cyclic solution mining process illustrated in FIG. 1 to enhance the soda ash recovery.

DETAILED DESCRIPTION

The evaporative crystallization is performed, in this invention, at a sufficiently high temperature to yield anhydrous sodium carbonate as the solid product, without co-crystallization of sodium chloride from the $Na_2CO_3$- and NaCl-containing feed solution. The anhydrous sodium carbonate is desirably crystallized from the feed solution at a temperature of at least 120° C. Enhanced yields of anhydrous sodium carbonate are obtained from the crystallizer feed solution when the crystallization temperature is preferably at least about 140° C., and most preferably at least about 160° C.

A superatmospheric pressure is necessary to achieve these crystallization temperatures. The superatmospheric pressure will generally range from about 30 psig for a crystallization temperature of about 120° C. to about 80 psig for a crystallization temperature of about 160° C.

The evaporative crystallizer is operated, in the invention, in a manner which yields a crystallizer mother liquor composition containing less than 10% by weight sodium carbonate. The corresponding sodium chloride content in such crystallizer mother liquor is generally in excess of 22% by weight NaCl. The crystallizer mother liquor composition preferably contains less than 9% $Na_2CO_3$ and, most preferably, less than 6% $Na_2CO_3$. These crystallizer mother liquor compositions are generally obtained when the crystallizer is operated at temperatures of 120° C. and 160° C., respectively.

Aqueous $Na_2CO_3$- and NaCl-containing solutions which are suitable for use as crystallizer feed solutions in this invention are those which contain a substantial amount of sodium chloride. Particularly suitable are aqueous solutions containing 10% by weight NaCl or more, up to about 22% NaCl. It should be evident, however, that solutions containing dilute concentrations of both $Na_2CO_3$ and $NaCl$ may be utilized in this method, being concentrated either prior to or during the evaporative crystallization of this invention to yield anhydrous sodium carbonate without co-crystallization of sodium chloride.

The NaCl-containing aqueous sodium carbonate solutions employed in this invention may contain a fairly high proportion of sodium chloride relative to the sodium carbonate content. The weight ratio of $NaCl:Na_2CO_3$ in the crystallizer feed solutions, however, should be such to ensure that no co-precipitation of sodium chloride occurs during crystallization of the anhydrous sodium carbonate product. The maximum permissible $NaCl:Na_2CO_3$ weight ratio for the feed solution, above which co-crystallization of sodium chloride in the anhydrous sodium carbonate crystallizer cannot be avoided, varies with the crystallization temperature employed. This maximum $NaCl:Na_2CO_3$ weight ratio may be approximated by the following mathematical expression, in which crystallization temperature is expressed in degrees Kelvin (°K):

$$\left(\frac{\%NaCl}{\%Na_2CO_3}\right)_{max} = 58.17 - 37.72\left(\frac{1000}{T}\right) + 6.29\left(\frac{1000}{T}\right)^2$$

It should be evident that at the preferred higher crystallization temperatures, a higher proportion of sodium chloride in the crystallizer feed solution is tolerable. For example, the $NaCl:Na_2CO_3$ weight ratio in feed solution for a crystallizer operated at 160° C. may be as high as about 4.6:1 and is preferably less than about 4.5:1. In a crystallizer operated at 120° C., however, the $NaCl:Na_2CO_3$ weight ratio in the feed solution should be less than about 2.9:1 and is desirably less than 2.7:1.

Aqueous $Na_2CO_3$- and NaCl-containing solutions appropriate for use in the method of this invention may be produced in cyclic solution mining processes which utilize NaOH-containing solvents for recovering soda ash from salt-contaminated subterranean ore deposits. The mining solution removed from the subterranean mine cavity is treated, via evaporative crystallization or the like, to precipitate sodium carbonate (anhydrous or monohydrate forms). The crystallization is not ordinarily capable of reducing the dissolved sodium carbonate content in the mother liquor below 10 to 12% by weight $Na_2CO_3$.

This $Na_2CO_3$ concentration in the crystallizer mother liquor, however, provides more than the minimal required carbonate values required to regenerate a suitable sodium hydroxide-containing mining solvent. Causticization of a 10–12% $Na_2CO_3$ solution yields a mining solvent containing 7.5–9% NaOH. A satisfactory aqueous mining solvent can contain as little as 3% NaOH, which requires only 4% $Na_2CO_3$ in the liquor being causticized.

Recovery of additional sodium carbonate values from the $Na_2CO_3$- and NaCl-containing crystallizer mother liquor, preferably reducing it to 4–6% by weight $Na_2CO_3$, is therefore desirable. Sodium carbonate values in the mother liquor which need not be converted to sodium hydroxide represent an unused inventory of sodium carbonate product which is continually recycled in the aqueous mining solvent. Recovery of these sodium carbonate values thus provides additional valuable product, improving the overall solution mining process efficiency.

The aqueous sodium carbonate solution may, in addition to its sodium chloride content, contain other species (e.g., $NaHCO_3$ unreacted residual NaOH, and the like), which are normally found in the mining solution recovered from a trona solution mining operation.

Aqueous sodium carbonate-sodium chloride solutions suitable for use as crystallizer feed solutions in this invention may also be derived from chlor-alkali electrolytic diaphragm cell operations, which ordinarily yield chlorine and caustic soda as products. The effluent stream from such an electrolytic diaphragm cell is typically a weak sodium hydroxide solution that also contains sodium chloride: 10–12% NaOH and 14.5–16% NaCl.

The weak sodium hydroxide solution, rather than being concentrated to yield caustic soda, may alternatively be carbonated with carbon dioxide or sodium bicarbonate to yield a sodium carbonate-sodium chloride solution: 13–16% $Na_2CO_3$ and 14–15% NaCl. The $Na_2CO_3$ content of such a carbonated solution is then recovered, as a solid, NaCl-free sodium carbonate product. The mother liquor which remains after recovery of the solids ordinarily contains residual unrecovered sodium carbonate in addition to all of the sodium chloride.

Recovery of these sodium carbonate values in this mother liquor, according to the method of this invention, is desirable for several reasons. An increased yield of sodium carbonate obviously improves the overall process recovery efficiency, this being a primary objective.

The mother liquor is ordinarily recycled to the electrolytic cell, after refortification with additional NaCl, to decompose its sodium chloride content to chlorine and caustic soda. Residual sodium carbonate which is returned to the electrolytic cell in the crystallizer mother liquor is decomposed into sodium hydroxide and carbon dioxide. The carbon dioxide is an undesirable byproduct since it complicates liquefaction of the desired chlorine NaCl-decomposition product.

The anhydrous sodium carbonate that is crystallized in the method of this invention is recovered from the crystallizer liquor by conventional liquid/solid separation techniques, e.g., filtration, centrifugation and the like. The separation and recovery of the anhydrous sodium carbonate crystals from the crystallizer mother liquor are desirably performed at near the crystallization temperature and pressure. This minimizes the possibility of undesirable redissolving of the anhydrous sodium carbonate product into the mother liquor and/or co-crystallization of sodium chloride during separation of the solid product from its mother liquor.

The anhydrous sodium carbonate crystals may be dried, as is, or converted to sodium carbonate monohydrate by recrystallization from aqueous solution, and this may also be dried to yield soda ash. Crystals formed under the preferred crystallization conditions in this invention have been found to be relatively uniform in quality, regardless of crystallization temperature.

After recovery of the anhydrous sodium carbonate product crystals from the crystallizer mother liquor, aqueous diluent, e.g., water, should be added to the liquor to ensure that no sodium chloride is precipitated upon cooling of the liquor below the crystallization temperature at atmospheric pressure. COMPARATIVE EXAMPLE A In a cyclic solution mining process for recovering soda ash from NaCl-contaminated subterranean trona ore deposits with an aqueous mining solvent containing 4.0% by weight NaOH at a temperature of 45° C., the NaCl-containing aqueous sodium carbonate solution withdrawn from the region of the trona deposit has the following composition (minor amounts of impurities being disregarded): 15% $Na_2CO_3$, 17.5% NaCl and the balance water.

Soda ash may be conventionally recovered from this solution as anhydrous sodium carbonate in an evaporative crystallization process, such as illustrated in the schematic flow diagram of FIG. 1. The anhydrous sodium carbonate evaporator 100 is operated at a temperature of 105° C. and at one atmosphere pressure. The feed solution 10 introduced into the evaporator 100 has the composition described above.

Sufficient water 12 is removed via evaporation from the anhydrous sodium carbonate evaporator 100 so as to yield anhydrous sodium carbonate 14 as the crystalline product and a mother liquor 16 which contains 10% $Na_2CO_3$ and 22% NaCl. The mother liquor 16 is essentially saturated with respect to $Na_2CO_3$ and NaCl at the crystallization temperature, 105° C. Further evaporation of water from the mother liquor at this temperature is undesirable, since it would result in the crystallization of both sodium carbonate and sodium chloride from the solution.

A soda ash production facility, based on the conventional evaporative crystallization operation described above, represents a viable scheme for producing one million tons per year of sodium carbonate. In such a soda ash process $36.9 \times 10^5$ pounds/hour of mining solution 10 are fed to the anhydrous sodium carbonate evaporator 100. Evaporative removal of $4.95 \times 10^5$ pounds/hour of water 12 from this solution in the evaporator 100 results in $2.60 \times 10^5$ pounds/hour of anhydrous sodium carbonate 14 being produced. The evaporator mother liquor 16, containing 10% $Na_2CO_3$ and 22% NaCl, is produced at a rate of $29.4 \times 10^5$ pounds/hour.

The evaporator mother liquor 16 is ordinarily causticized, as shown in FIG. 1, in a causticizer 200 with lime 18 to yield an aqueous NaCl-containing sodium hydroxide solution 20 and by-product solid calcium carbonate (not shown in the Figure). Only a portion of the sodium carbonate in the evaporator mother liquor 16 has to be causticized to regenerate the required 4.0% NaOH needed in the recycled aqueous mining solvent 20. The regenerated aqueous sodium hydroxide solvent 20 thus contains unrecovered sodium carbonate values which are recycled in this process at a rate of $1.38 \times 10^5$ pounds/hour of $Na_2CO_3$.

Recovery of all of these sodium carbonate values from the recycled aqueous mining solvent 20 is very desirable since it would increase the anhydrous sodium carbonate product yield over 50%, from one million tons/year to 1.527 million tons/year.

EXAMPLE 1

Example 1 illustrates the method of this invention in which an anhydrous sodium carbonate crystallizer is utilized to recover additional sodium carbonate values in the solution mining process described in Comparative Example A. The overall process is shown in the schematic flow diagram of FIG. 2.

A feed solution 22 from the solution mine operation is introduced into a conventional evaporator operated at a temperature of 105° C. and at atmospheric pressure. Water 24 is evaporated to crystallize anhydrous sodium carbonate 26 and yield a saturated mother liquor 28, as was described in Comparative Example A.

Additional anhydrous sodium carbonate is recovered from the $Na_2CO_3$- and NaCl-saturated mother liquor 28 in this process by utilizing an anhydrous crystallizer 400, into which is introduced the mother liquor 28 from the conventional evaporator 300, as crystallizer 400 feed solution.

The evaporative crystallizer 400 shown in FIG. 2 is operated, in the method of this invention, at a temperature of 120° C. and at a superatmospheric pressure of 32 psig. The crystallizer feed solution 28 contains 10% by weight $Na_2CO_3$ and 22% by weight NaCl, which corresponds to the mother liquor composition from the evaporator 100 (in FIG. 1) described in Comparative Example A.

Through the evaporative removal of water 30 from the crystallizer 400, additional sodium carbonate values contained in the feed solution 28 are recovered as anhydrous sodium carbonate 32 without co-crystallization of sodium chloride. Sufficient water 30 is evaporated to yield a mother liquor 34 from the crystallizer 400 containing 9.0% by weight $Na_2CO_3$ and 23.0% by weight NaCl.

The anhydrous sodium carbonate crystallizer 400, operated in this fashion, recovers an additional 156,900 tons/year of anhydrous sodium carbonate 32 in addition to the one million tons/year of product 26 recovered from the conventional evaporator 300. This additional anhydrous sodium carbonate 32 amounts to about 30% of the recoverable sodium carbonate values contained in the regenerated, recycled aqueous mining solvent (stream 20 in FIG. 1) of Comparative Example A.

It should be noted that the crystallizer 400 could be operated, if desired, as the sole crystallizer in the process shown in FIG. 2, with its feed being solution stream 22. The anhydrous sodium carbonate recovered would then correspond in amount to the total of streams 26 and 32 in FIG. 2.

After separation of the product 32 of the crystallizer 400 from its mother liquor 34, the mother liquor 34 is diluted with water (not shown in the FIG. 1) in order to prevent sodium chloride from precipitating when the liquor is allowed to cool below the crystallization temperature. The dilution water added to the mother liquor 34 serves to compensate for the volume of solution lost in the underground cavity which replaces the dissolved trona ore.

The crystallizer mother liquor 34 is subsequently causticized, as shown in FIG. 2, in a causticizer 500 with lime 36 to convert a portion of its sodium carbonate content to sodium hydroxide, with calcium carbonate being a solid by-product (not shown in the Fig.). The causticization is controlled so as to yield an aqueous NaCl-containing sodium hydroxide solution 38 which contains about 4% by weight NaOH. The NaOH-containing solution 38 is recycled as regenerated aqueous mining solvent to the region of the subterranean ore deposit to repeat the cycle of recovery.

EXAMPLE 2

Example 2 is similar to Example 1, except that the anhydrous sodium carbonate crystallizer 400 shown in FIG. 2 is operated in this Example at a higher temperature (160° C.) and superatmospheric pressure (77 psig). At the preferred operating temperature of this Example, the recovery of additional sodium carbonate from the Na$_2$CO$_3$- and NaCl-saturated mother liquor 28 is improved dramatically, still without co-crystallization of salt.

The feed to the crystallizer in Example 2 is the same NaCl-containing sodium carbonate solution utilized in Example 1, having a composition of 10% Na$_2$CO$_3$ and 22% NaCl (shown as stream 28 in FIG. 2).

The evaporative crystallizer is operated at a temperature of 160° C. and at a superatmospheric pressure of 77 psig and yields anhydrous sodium carbonate (corresponding to stream 32 in FIG. 2) and a crystallizer mother liquor (corresponding to stream 34 in FIG. 2) containing only 6.3% Na$_2$CO$_3$ and 26.0% NaCl. The crystallization of anhydrous sodium carbonate is accomplished, moreover, without any co-crystallization of sodium chloride.

If operated as the crystallizer 400 shown in the conventional soda ash process of FIG. 2, the anhydrous sodium carbonate crystallizer of Example 2 increases sodium carbonate yield by over 50%: an additional 527,000 tons/year of anhydrous sodium carbonate (corresponding to stream 32 in FIG. 2) are recovered beyond the one million tons/year of material (stream 26 in FIG. 2) produced from the conventional evaporator 300 in FIG. 2.

This additional anhydrous sodium carbonate represents virtually all of the recoverable sodium carbonate values contained in the solution fed to the crystallizer (block 400 in FIG. 2). The 6.3% Na$_2$CO$_3$ contained in the mother liquor after this cystallization is unrecoverable, from a practical standpoint, since it is fully utilized during causticization to regenerate aqueous mining solvent.

After causticization of the mother liquor, the NaOH-containing aqueous mining solvent (corresponding to stream 38 in FIG. 2) contains minimal sodium carbonate values and has the requisite 4% by weight NaOH content. The regenerated aqueous mining solvent is returned to the solution mining and the cycle of recovery is repeated.

COMPARATIVE EXAMPLE B

In the production of chlorine and caustic soda via electrolysis in a diaphragm cell, the weak caustic soda solution which is removed from the diaphragm cell typically contains 11.6% NaOH, 15.9% NaCl and the balance, H$_2$O. This solution may be carbonated with CO$_2$ to form an aqueous NaCl-containing sodium carbonate solution which contains 14.5% Na$_2$CO$_3$ and 15.0% NaCl.

Soda ash may be conventionally recovered from such a solution as anhydrous sodium carbonate by introducing the solution into an evaporative crystallizer operated at a temperature of 105° C. and at atmospheric pressure. Evaporative removal of water from the anhydrous sodium carbonate crystallizer results in the formation of anhydrous sodium carbonate as a solid product and a crystallizer mother liquor which typically contains 10% Na$_2$CO$_3$ and 22% NaCl. For each 100 pounds of solution fed to the anhydrous evaporative crystallizer, about 7.6 pounds anhydrous sodium carbonate are recovered and 67.9 pounds of mother liquor are produced.

Only slightly more than half of the sodium carbonate content in the crystallizer feed solution is thus recovered, leaving about 47% of the sodium carbonate unrecovered in the crystallizer mother liquor. Recovery of the sodium carbonate content, or at least a portion thereof, in the mother liquor from the crystallizer is clearly desirable.

If the crystallizer mother liquor stream is simply recycled to the electrolytic cell, these residual sodium carbonate values represent an unrecovered inventory which decreases overall process efficiency and which may contribute to operating problems in the cell, via CO$_2$ generated by Na$_2$CO$_3$ decomposition.

EXAMPLE 3

Example 3 illustrates the operation of an anhydrous sodium carbonate crystallizer operated at a temperature of 160° C. and a superatmospheric pressure of 77 psig in the method of this invention. The feed to the crystallizer in this Example is the NaCl-containing sodium carbonate solution which was derived from the carbonation of the chlor-alkali electrolytic diaphragm cell effluent described in Comparative Example B and thus has a composition of 14.4% Na$_2$CO$_3$ and 15.0% NaCl.

The anhydrous sodium carbonate crystallizer, operated at a temperature of 160° C. and superatmospheric pressure of 77 psig, recovers about three quarters (75.2%) of the sodium carbonate values contained in the feed liquor and yields a crystallizer mother liquor containing a high proportion of salt compared to the residual sodium carbonate: 6.3% Na$_2$CO$_3$ and 26.3% NaCl.

By operating the anhydrous sodium carbonate crystallizer in the matter of this invention, rather than as a conventional anhydrous crystallizer at a temperature of 105° C. as described in Comparative Example B, the recovery of NaCl-free sodium carbonate from the crystallizer feed is significantly improved. For each 100 pounds of solution fed to the anhydrous evaporative crystallizer in this Example, about 10.9 pounds of NaCl-free anhydrous sodium carbonate are recovered (vs. 7.6 pounds in Comparative Example B) and 56.8 pounds of mother liquor are produced. The recovery of sodium carbonate is thus improved by 42% when compared to the yield obtained in Comparative Example B. The amount of carbon dioxide contained in the recycled crystallizer mother liquor of this Example was thus decreased by over 47% when compared to the crystallizer mother liquor being recycled in Comparative Example B.

The crystallizer mother liquor obtained in the method of this Example, containing only 6.3% Na$_2$CO$_3$, may be recycled to the chlor-alkali electrolytic cell for conversion of its sodium chloride content to additional chlorine and caustic soda.

We claim:

1. A method for enhancing recovery of sodium carbonate values from an NaCl-containing aqueous sodium carbonate solution, which comprises subjecting an aqueous sodium carbonate solution which contains at least about 10% by weight sodium chloride to evaporative crystallization at superatmospheric pressure and at a temperature of at least 120° C. to induce crystallization of anhydrous sodium carbonate crystals without co-crystallization of sodium chloride until a crystallizer mother liquor containing less than 9% by weight Na$_2$CO$_3$ and greater than 23% by weight NaCl is obtained; and separating the crystallized anhydrous sodium carbonate without NaCl crystallization from the crystallizer mother liquor to recover an anhydrous sodium carbonate product, essentially free of sodium chloride.

2. In the method of producing sodium carbonate from the aqueous NaOH- and NaCl-containing effluent from a chloralkali electrolytic diaphragm cell by carbonating the effluent, the improvement for recovering anhydrous sodium carbonate from the carbonated effluent which comprises subjecting the $Na_2CO_3$- and NaCl-containing effluent containing at least 10% by weight sodium chloride to evaporative crystallization at superatmospheric pressure and at a temperature of at least 120° C. to induce crystallization of anhydrous sodium carbonate without co-crystallization of sodium chloride until a crystallizer mother liquor containing less than 9% by weight $Na_2CO_3$ and greater than 23% by weight NaCl is obtained; and separating the crystallized anhydrous sodium carbonate without NaCl crystallization from the crystallizer mother liquor to recover an anhydrous sodium carbonate product, essentially free of sodium chloride.

3. The method of claim 2 which further comprises recycling the NaCl-containing crystallizer liquor, after recovery of the product therefrom, to the electrolytic cell.

4. In the cyclic method of recovering alkali values by solution mining from subterranean trona ore deposits by the steps of introducing an aqueous sodium hydroxide solvent into contact with in situ trona ore to effect dissolution of sodium sesquicarbonate in the ore; withdrawing the resultant sodium carbonate-containing solution; crystallizing and recovering a sodium carbonate salt from such solution, leaving behind a mother liquor; causticizing residual sodium carbonate in the mother liquor; and recycling causticized mother liquor as aqueous sodium hydroxide solvent, the improvement for enhancing recovery of sodium carbonate values from an NaCl-containing aqueous sodium carbonate solution which results from solution mining trona deposits associated with substantial deposits of sodium chloride, which comprises subjecting such aqueous sodium carbonate solution which contains at least about 10% by weight sodium chloride to evaporative crystallization at superatmospheric pressure and at a temperature of at least 120° C. to induce crystallization of anhydrous sodium carbonate crystals without co-crystallization of sodium chloride until a crystallizer mother liquor containing less than 9% by weight $Na_2CO_3$ and greater than 23% by weight NaCl is obtained but leaving sufficient sodium carbonate dissolved in solution for its causticization to sodium hydroxide that is required in the recycled aqueous sodium hydroxide solvent; and separating the crystallized anhydrous sodium carbonate without NaCl crystallization from the crystallizer mother liquor to recover an anhydrous sodium carbonate product, essentially free of sodium chloride.

5. The method of claim 1, 2 or 4 wherein the NaCl-containing sodium carbonate solution subjected to evaporative crystallization possesses an $NaCl:Na_2CO_3$ weight ratio which is less than 2.7:1.

6. The method of claim 1, 2 or 4 wherein the crystallization temperature is sufficiently high to reduce the sodium carbonate concentration in the crystallizer mother liquor below 6% by weight $Na_2CO_3$.

7. The method of claim 1, 2 or 4 wherein the temperature of the crystallizer is at least about 160° C.

8. The method of claim 7 wherein the NaCl-containing sodium carbonate solution subjected to evaporative crystallization possesses an $NaCl:Na_2CO_3$ weight ratio which is less than about 4.5:1.

9. The method of claim 1, 2 or 4 which further comprises introducing an aqueous diluent into the solids-free crystallizer mother liquor in an amount sufficient to prevent precipitation of sodium chloride upon cooling of the mother liquor below the crystallization temperature at atmospheric pressure.

* * * * *